(12) United States Patent
Plourde et al.

(10) Patent No.: US 6,644,581 B2
(45) Date of Patent: Nov. 11, 2003

(54) FLANGE GUIDE FOR IMPROVED TAPE WINDING

(75) Inventors: Douglas R. Plourde, Somerset, WI (US); Helen J. Yoo, Maplewood, MN (US); William R. Qualls, River Falls, WI (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/896,493

(22) Filed: Jun. 29, 2001

(65) Prior Publication Data
US 2003/0001037 A1 Jan. 2, 2003

(51) Int. Cl.[7] ............................................. G11B 23/04
(52) U.S. Cl. ................ 242/346.1; 242/335; 242/346.2; 242/615.2; 242/615.3; 360/93
(58) Field of Search ............................. 242/335, 346.1, 242/346.2, 397.5, 547, 548, 615.2, 615.3; 360/132, 85, 92, 93, 96.1

(56) References Cited

U.S. PATENT DOCUMENTS

| | | | | |
|---|---|---|---|---|
| 3,722,829 A | * | 3/1973 | Arnoldussen | 242/346.1 |
| 3,841,582 A | * | 10/1974 | Schaeffer et al. | 242/346.1 |
| 3,856,235 A | * | 12/1974 | Wallace | 242/346.1 |
| 4,778,119 A | * | 10/1988 | Yamazaki et al. | 242/547 X |
| 5,474,250 A | * | 12/1995 | Birkmann et al. | 242/547 |
| 5,533,690 A | * | 7/1996 | Kline et al. | 242/547 |
| 6,062,500 A | * | 5/2000 | Coles | 360/132 X |
| 2001/0023885 A1 | * | 9/2001 | Fraberger | 242/346.2 X |

FOREIGN PATENT DOCUMENTS

| | | | | |
|---|---|---|---|---|
| JP | 55-111341 A | * | 8/1980 | 242/547 |
| JP | 5/151663 | * | 6/1993 | 242/346.2 X |

* cited by examiner

Primary Examiner—John Q. Nguyen
(74) Attorney, Agent, or Firm—Eric D. Levinson

(57) ABSTRACT

A winding flange guide (10) is utilized to provide a better quality wind of a strand media. The guide (10) has a first flange (12) and a second flange (13) which constrain the movement of the outer wraps of the tape pancake formed by the tape media. The winding flange guide (10) is utilized in a servo writer (20), tape cartridge (40, 60) and tape drive (80).

12 Claims, 17 Drawing Sheets

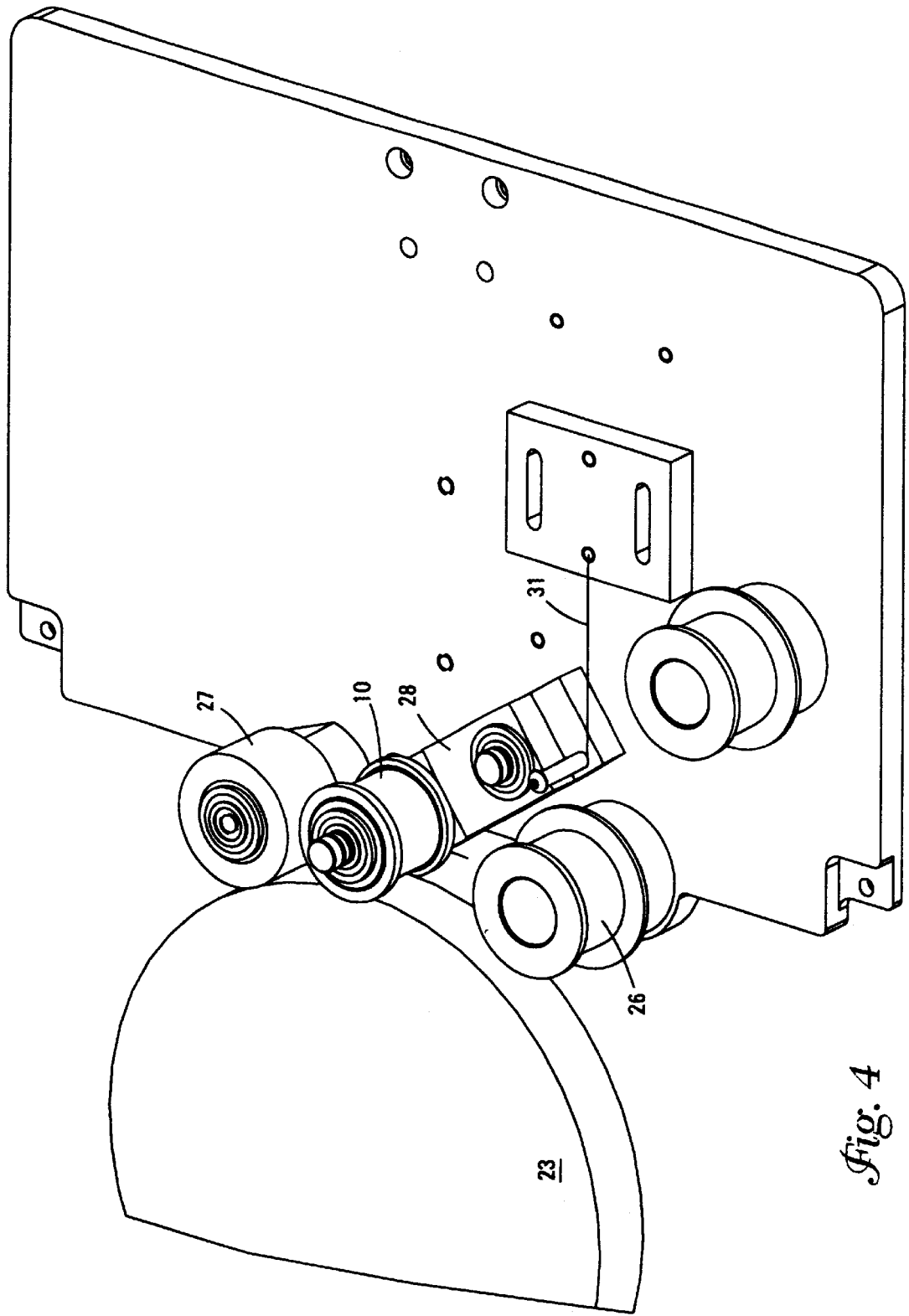

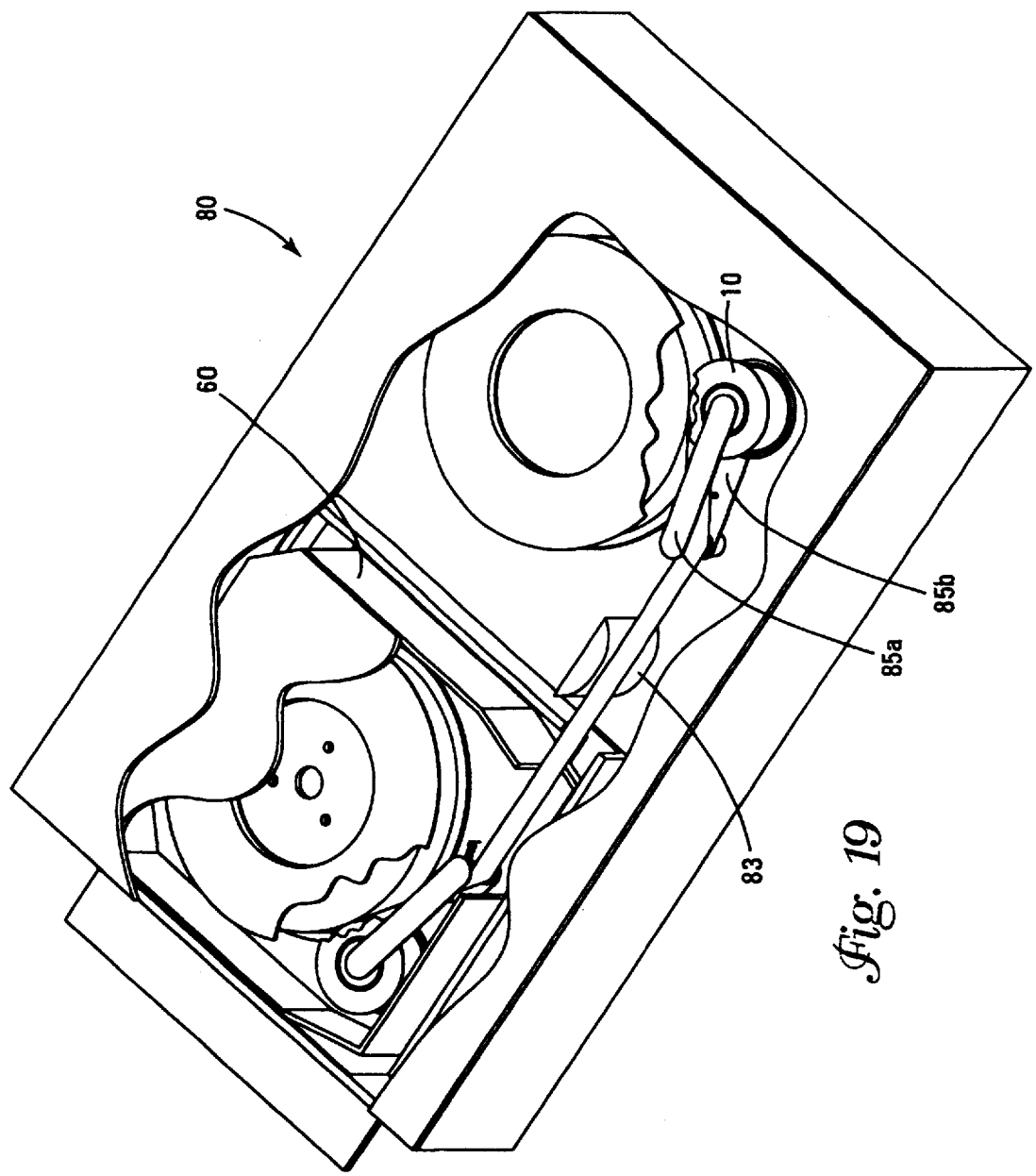

FLANGE GUIDE FOR IMPROVED TAPE WINDING

BACKGROUND OF THE INVENTION

This invention relates generally to the winding of tape and more particularly to a method and apparatus for using a winding flange guide for improved tape winding.

As the industry moves to higher track densities, higher processing and operating speeds, and thinner, smoother media, the ability to create a high quality wind becomes increasingly critical. This is true whether the strand media is being servowritten, or being used in a cartridge/drive. Current tape processing technology involves using an idler guide to guide the tape as it comes into the pancake and a pack wheel to apply pressure to squeeze out the entrapped air between wraps; higher wind tensions can also help squeeze out the air. The formation of a stable pack depends on one's ability to achieve asperity to asperity contact between adjacent tape layers, therefore locking the wraps in place on the pancake, before the tape wraps have a chance to slide on the entrapped layers of air. This tape motion can result in scatter winds and popped strands. Popped strands are highly susceptible to edge damage during handling of the pancake and both popped strands and scatter winds result in undesirable tape motion at the recording/servo head. As media becomes smoother, it becomes increasingly difficult to achieve asperity to asperity contact and, consequently, to achieve an acceptable wind or to even wind the tape at all. Increasing the pack force and/or the wind tension are potential ways to overcome this obstacle, but because the industry is moving towards thinner and thinner media, damage to the media as a result of these increased forces becomes an important issue. The present invention will constrain these floating wraps until the entrapped air is expelled and it is possible to move to lower pack forces and wind tensions and still obtain high quality winds, even with thinner, smoother media.

Further problems with packing occur as processing speeds increase. As the tape speed increases, the amount of air that is trapped between layers during winding also increases and pack quality suffers. In this case, the present invention can constrain all of the floating wraps until the entrapped air can be expelled. This permits higher tape processing speeds and, consequently, increased throughput.

Current art for tape cartridges and tape drives uses large flanges to provide an envelope for lateral tape motion (no pack wheel is used). These flanges permit a relatively large amount of lateral tape motion during winding before the tape tension forces out the entrapped air. This often results in scatter winds and subsequent tape motion at the recording head as the pack then unwinds. In fact, the tape will often hit the flanges as it winds/unwinds and this motion is transmitted directly to the head. Because track densities are constantly increasing, any lateral motion at the head becomes very critical because it can lead to servo errors and cartridge failure. By using the present invention in a drive, either with the existing flanges or in place of them, one can reduce and/or eliminate the scatter winds/thrown wraps that result in tape motion at the head and tape edge damage/wear. The present invention can also be used in a cartridge in addition to the flanges or in place of them. If keeping the flanges is desirable (as protection in case the cartridge is dropped, for example), the present invention can be designed to fit inside of the flanges so that it will not interfere with them.

SUMMARY OF THE INVENTION

In one embodiment, the invention is a method of winding a tape to form a tape pancake. An end of the tape is attached to a reel. The reel is rotated to wind the tape on the reel and to form a tape pancake. The tape is then guided as it is being wound with a winding flange guide, the winding flange guide having a first flange based from a second flange, the first and second flanges forming an opening less than 0.0012 inches wider than the tape's width. The winding flange guide is positioned proximate the tape pancake and the first and second flanges extend over the outer wraps of the tape pancake.

In another embodiment, the invention is a take-up reel assembly for receiving a magnetic tape having a thickness and width. The tape is received from a tape source. A rotatable take-up reel has a first end of a magnetic tape operatively connected thereto. A rotatable idler guide is positioned between the take-up reel and the tape source. The magnetic tape forms a tape pancake as the magnetic tape is wound around the take-up reel, and creates a tangent point where the magnetic tape contacts the tape pancake. A winding flange guide has a hub having a first end and a second end. A first flange is operatively connected to the first end of the hub, the first flange having a first guiding surface. A second flange is operatively connected to the second end of the hub, the second flange having a second guiding surface. The winding flange guide is positioned to contact the tape pancake at or after the point of tangency, wherein the tape pancake is guided between the first and second guiding surfaces.

In another embodiment, the invention is a tape cartridge having a housing. A magnetic tape, having a thickness and a width, has a first end operatively connected to a rotatable take-up reel, the reel operatively connected to the housing. A rotatable idler guide is operatively connected to the housing. The magnetic tape forms a tape pancake as the magnetic tape is wound around the take-up reel, and creates a tangent point where the magnetic tape contacts the tape pancake. A winding flange guide has a hub having a first end and a second end. The first flange is operatively connected to the first end of the hub, the first flange having a first guiding surface. The second flange is operatively connected to the second end of the hub, the second flange having a second guiding surface. The winding flange guide is positioned to contact the tape pancake at or after the point of tangency, wherein the tape pancake is guided between the first and second guiding surfaces. The guide is operatively connected to the housing and biased to contact the tape pancake.

In another embodiment, the invention is a take-up reel assembly for receiving a magnetic tape having a thickness and a width. The tape is received by the take-up reel from a tape source. The reel assembly includes a mounting member and a rotatable take-up reel, the magnetic tape having a first end operatively connected to the take-up reel, the take-up reel operatively connected to the mounting member. A rotatable idler guide is positioned between the take-up reel and tape source, the idler operatively connected to the mounting member. A magnetic tape forms a tape pancake as the magnetic tape is wound around the take-up reel, and creates a tangent point where the magnetic tape contacts the tape pancake. A winding flange guide is operatively connected to the mounting member. The guide includes a hub having a first end and a second end. A first flange is operatively connected to the first end of the hub, the first flange having a guiding surface. A second flange is operatively connected to the second end of the hub, the second flange having a second guiding surface. The winding flange guide is positioned to contact the tape pancake at or after the point of tangency, wherein the tape pancake is guided between the first and second guiding surfaces. The first flange and second flange have a length that is less than 100 times the thickness of the magnetic tape and the length of the first and second flanges is greater than 10 times the thickness of the tape media.

In another embodiment, the invention is a tape drive having a housing. A magnetic tape having a thickness and a width has a first end operatively connected to a rotatable take-up reel, the reel operatively connected to the housing. A rotatable idler guide is positioned between the take-up reel and tape source, the idler guide operatively connected to the housing. The magnetic tape forms a tape pancake as the magnetic tape is wound around the take-up reel and creates a tangent point where the magnetic tape contacts the tape pancake. A winding flange guide has a hub having a first and second end. A first flange is operatively connected to the first end of the hub, the first flange having a first guiding surface. The second flange is operatively connected to the second end of the hub, the second flange having a second guiding surface. The winding flange guide is positioned to contact the tape pancake at or after the point of tangency, wherein the tape pancake is guided between the first and second guiding surfaces. The guide is operatively connected to the housing and biased to contact the tape pancake. The housing has a section to receive a tape cartridge on which the magnetic tape is stored.

In another embodiment, the invention is a servo writer having a mounting member. A rewind plate assembly is slidably mounted to the mounting member. A take-up reel is rotatably mounted to the mounting member. A rotatable idler guide is operatively connected to the mounting member. The magnetic tape forms a tape pancake as the tape is wound around the take-up reel and creates a tangent point where the magnetic tape contacts the tape pancake. A winding flange guide is operatively connected to the rewind assembly plate. The guide includes a hub having a first end and a second end. A first flange is operatively connected to the first end of the hub, the first flange having a first guiding surface. The second flange is operatively connected to the second end of the hub, the second flange having a second guiding surface. The winding flange guide is positioned to contact the tape pancake at or after the point of tangency, wherein the tape pancake is guided between the first and second guiding surfaces.

BRIEF DESCRIPTION OF THE DRAWINGS

FIG. 4 is a perspective view of the servo writer shown in FIG. 3;

FIG. 19 is another perspective view of the drive shown in FIG. 18.

DETAILED DESCRIPTION OF THE PREFERRED EMBODIMENT

Figure 1:
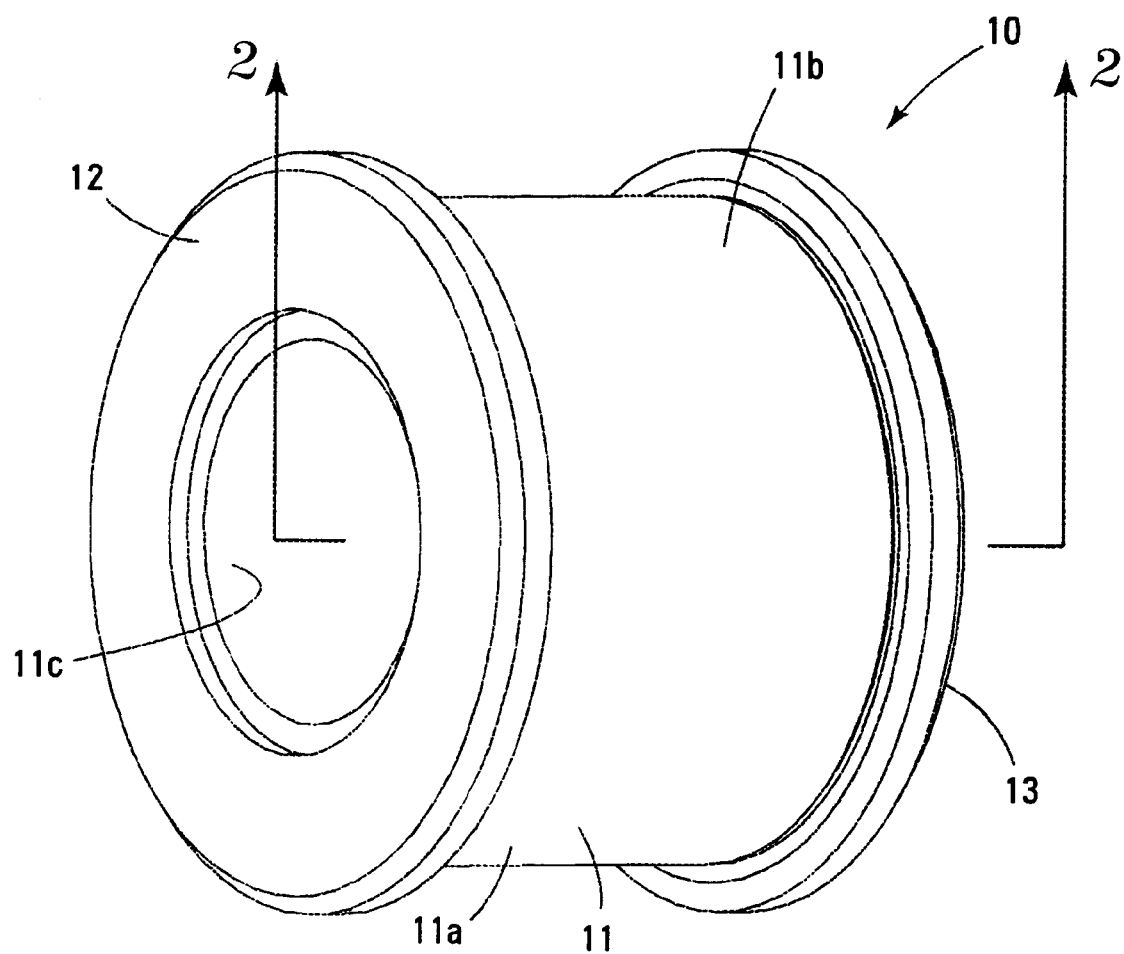
FIG. 1 is a perspective view of a winding flange guide of the present invention.
Figure 2:
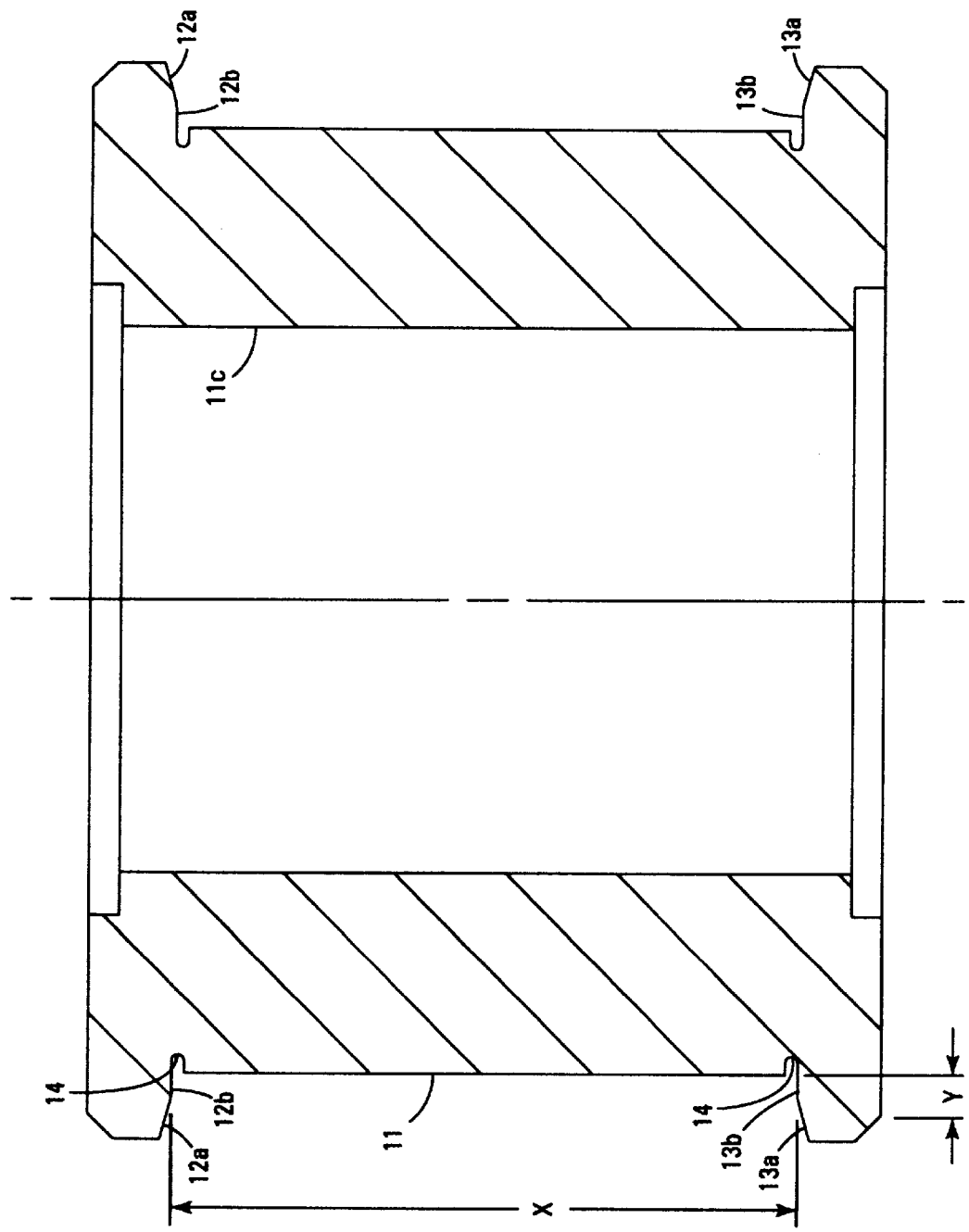
FIG. 2 is a cross-sectional view of the winding flange guide shown in FIG. 1 taken generally along the line 2—2.

Referring to the drawings, wherein like numerals represent like parts throughout the several views, there is generally disclosed at 10 a winding flange guide. The winding flange guide 10 is in the shape of a spool and has a central hub section 11 and having a first end 11a and a second end 11b. A first flange 12 is operatively connected to the first end 11a and a second flange 13 is operatively connected to the second end 11b. Preferably, the hub section 11 and flanges 12, 13 are formed as an integral one-piece unit. The flanges 12, 13 are mirror images of each other. The flanges 12, 13 have a lead in angled surface 13a, 12a and a land area 12b, 13b. The hub 11 and flanges 12, 13 (the portions that would touch the magnetic tape) are polished to a mirror finish, for example at least 8Ra microinches or better. It is preferred that the finish is 4Ra microinches or better and a finish of 1Ra microinches or better is more preferred. Further, a finish of 0.5Ra microinches has been used with very good results, it being understood that the finish is better. The hub section 11 has a central bore 11c which is used for mounting the winding flange guide 10. The distance X, the distance between the lands 12b, 13b is dependent upon the size of the media being wound. The distance X is between 0.0002 inches to 0.0012 inches larger than the tape media, and preferably between 0.0002 to 0.0007 inches larger than the tape media. This distance allows for a guide 10 to promote better winding, as will be discussed more fully hereafter. The lead in surfaces 12a, 13a provide for an angled surface to further guide the tape media into the guide 10. The length of the land 12b, 13b is designated by Y in FIG. 2 and represents the distance from the hub 11 to the lead in surfaces 12a, 13a. This distance Y is dependent upon the thickness of the tape media. Preferably, the length of the land 12b, 13b is preferably 100 times or less than the thickness of the tape media and preferably 60 times or less than the thickness of the tape media. It is necessary to constrain the tape media after several layers have been wrapped. Therefore, the distance Y is preferably always at least 10 times the thickness of the tape media. It has been found that the preferred distance is between 50 to 60 times the thickness of the media. The land area 12b, 13b are generally parallel to each other, however, there may be a slight outward angle of a small amount such as 0.5 degrees. The angle of the lead in surface 12a, 13a is angled approximately 15 degrees to the horizontal. The lands 12b, 13b provide for the guiding surfaces, between which the magnetic tape is positioned. The guide 10 is preferably an integral one-piece unit, but the components could be made separately and then fastened. Slots 14 are a tool relief so the width may be machined precisely.

Figure 3:
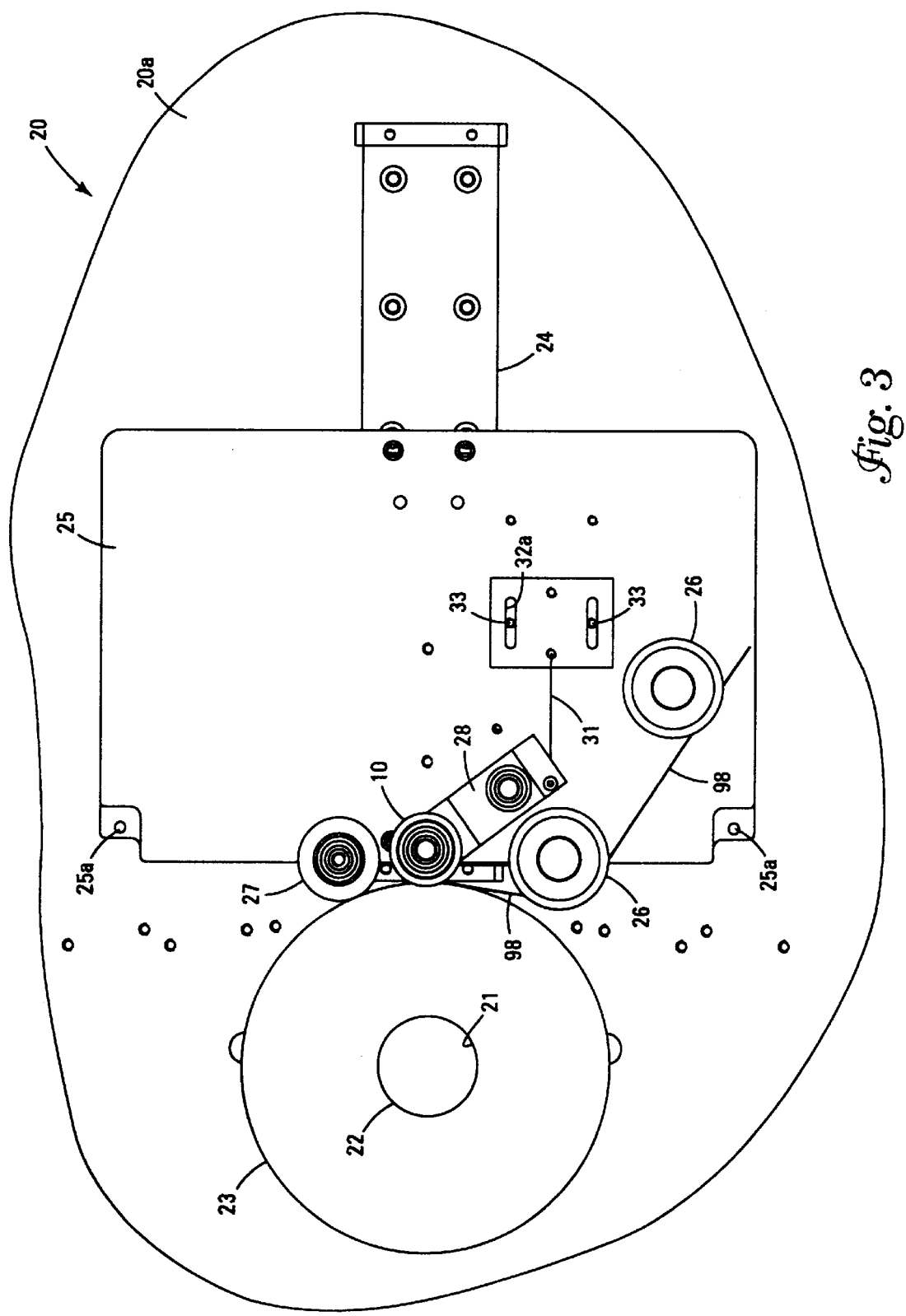
FIG. 3 is a top plan view of a portion of a servo writer incorporating the winding flange guide shown in FIG. 1.
Figure 5:
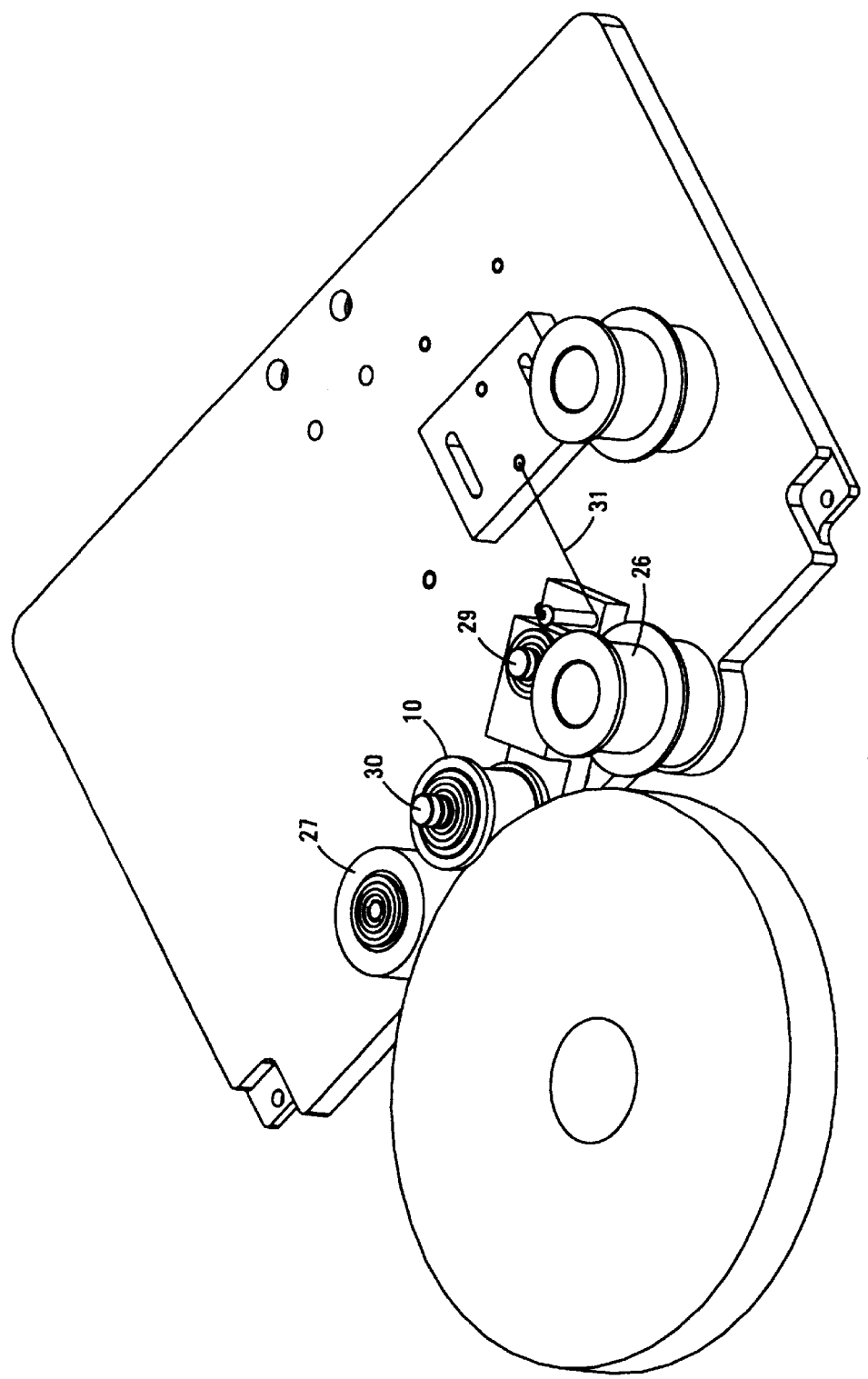
FIG. 5 is another perspective view of the servo writer shown in FIG. 3.
Figure 6:
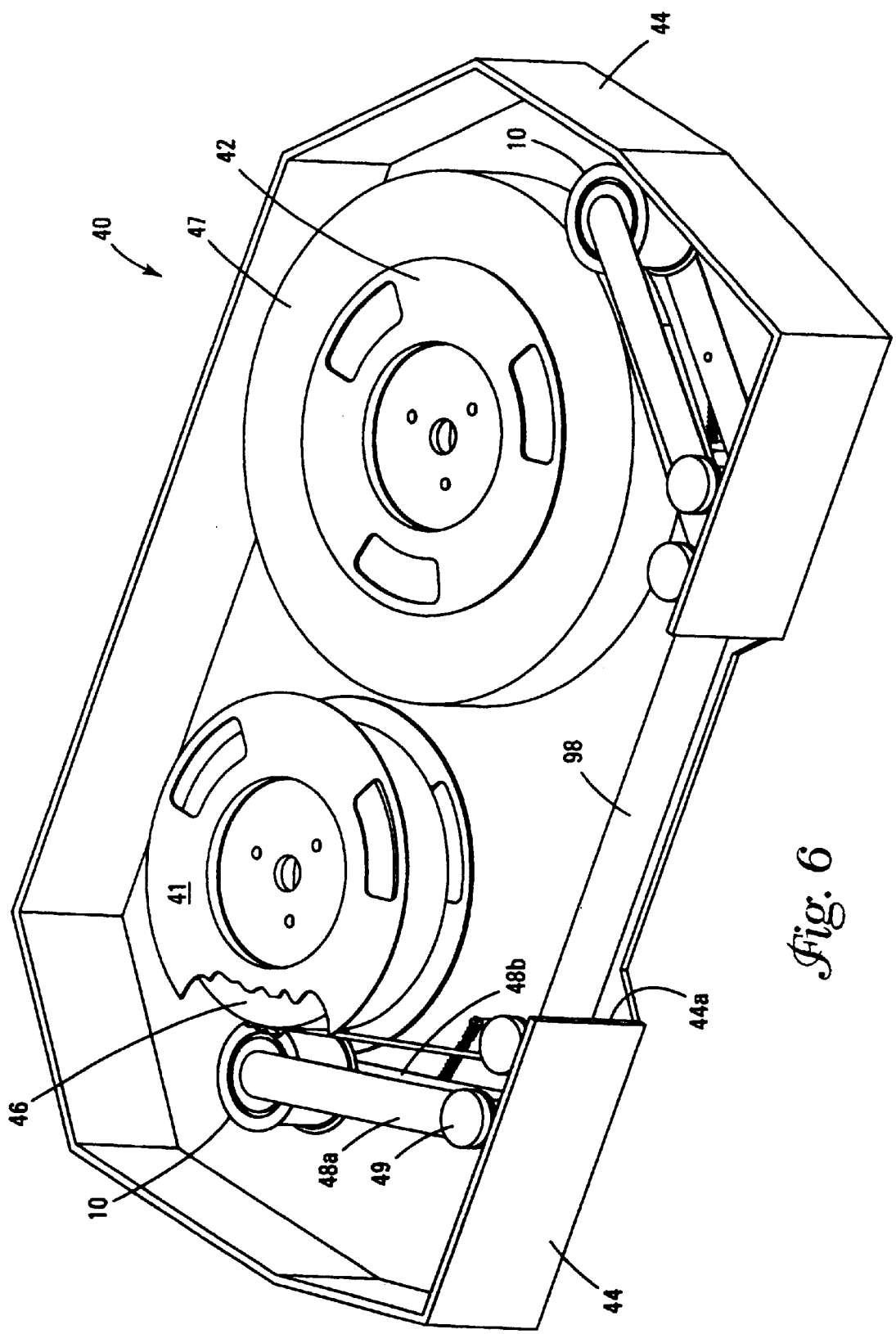
FIG. 6 is a perspective view of a dual reel tape cartridge incorporating the winding flange guide shown in FIG. 1.
Figure 7:
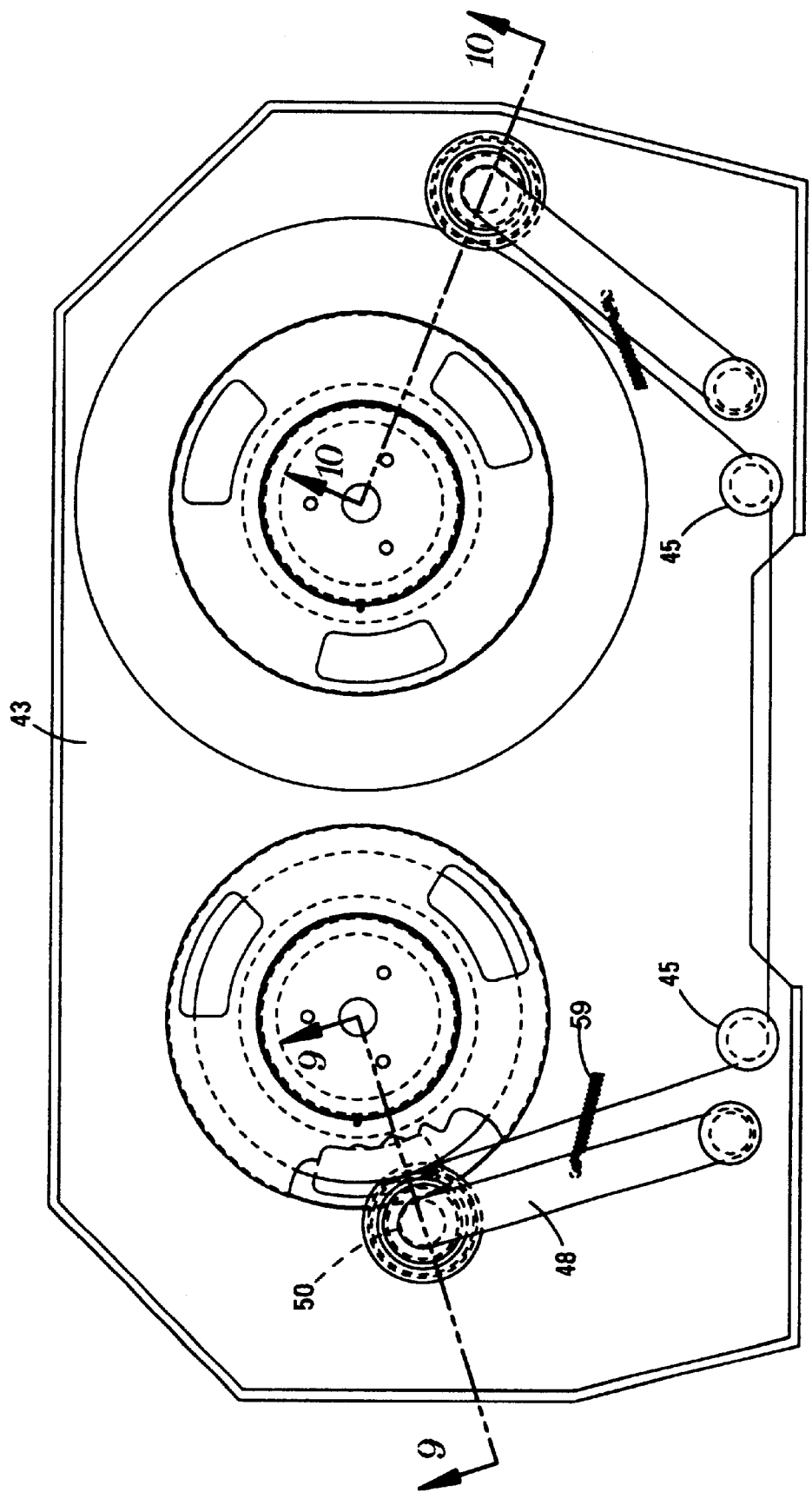
FIG. 7 is a top plan view of the cartridge shown in FIG. 6.

FIGS. 3 through 5 show the winding flange guide 10 in use in conjunction with a servo writer, generally designated at 20. Servo writers are well known in the art. The winding flange guide 10 may be used on any suitable servo writer. Only those portions of the servo writer which are new are shown in the figures, it being understood that the other portions of the servo writer, such as the unwind section, read/write head, and cleaning process are not shown as they are well known in the art. A portion of the rewind section of the servo writer 20 is shown in the figures. A take-up reel 21 has a hub 22 which has a fixed point of rotation and is suitably mounted to the member 20a. The reel 21 is driven by suitable means (not shown) well known in the art. The hub 22 has a plurality of wraps of a tape media to form a tape pancake 23 that is wound around the hub 22 of the take-up reel 21. A linear slide 24 is mounted to the member 20a of the servo writer 20 and is fixed in position. A rewind assembly plate 25 is slidably mounted on the slide 24, by means well known in the art. Typically, air cylinders are secured at the holes 25a to provide for linear motion along the linear slide 24. Two idler guides 26 are rotatably mounted to the rewind plate assembly 25. A pack wheel 27 is mounted on the rewind assembly plate 25. As the tape pancake 23 grows or decreases in size, the rewind assembly plate 25 is moved to keep the pack wheel 27 in contact with the tape pancake 23. An arm 28 is pivotally mounted about a post 29, which is mounted in the rewind plate assembly 25. A second post 30 is mounted to the other end of the arm 28 and the bore 11c of the hub section 11 is positioned over the second post 30 to rotatably mount the winding flange guide 10. A tension spring 31 has a first end operatively connected to the arm 28 and a second end to a mounting block 32, which is in turn mounted on the rewind plate assembly 25. The mounting block 32 may have slots 32a formed therein. Screws 33 are used to secure the mounting block 32 in position. By movement along the slot 32a, the tension of the spring 31 may be easily adjusted.

The tension of the spring 31 causes the hub section 11 to ride on the outer wrap of the tape pancake 23. The embodiment, as shown in the figures, has a rotatable winding flange guide 10. However, it is appreciated that the guide 10 would not have to pivot if the guide 10 could be moved laterally as the tape pancake 23 grew or decreased in size. The guide 10 would still need to rotate to reduce relative motion between the tape pancake and the guide. The movement would be necessary to ensure that the land sections 12b, 13b overlie the outer wraps of the tape pancake.

Figure 3A:
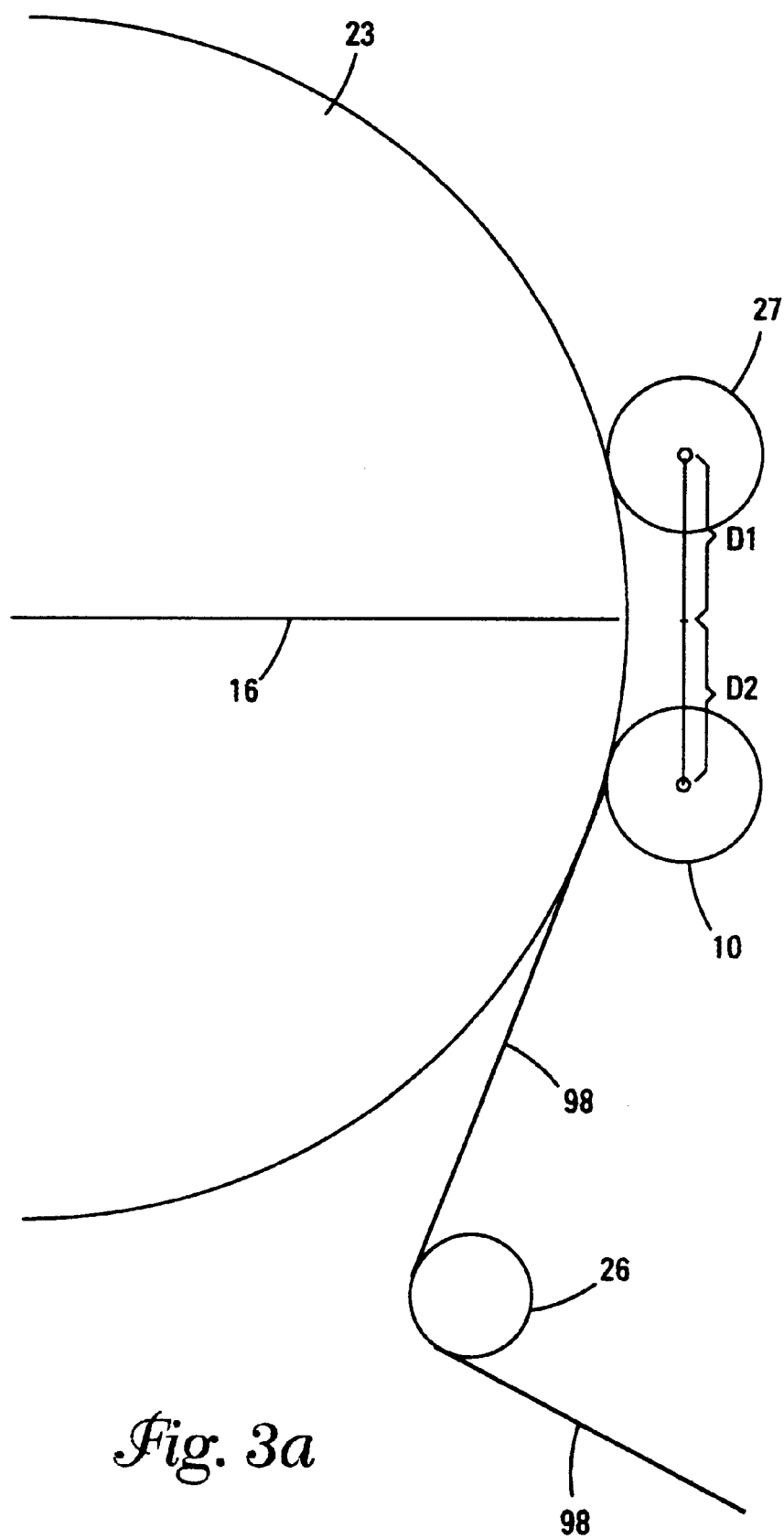
FIG. 3a is a schematic version of another embodiment of the present invention.

The height of the winding flange guide 10 and idler 26 are aligned so that the tape media does not have a bend as it is being wrapped to form the tape pancake 23. Further, it is preferred that the flange guide 10 does not contact the tape pancake until after the media has been wrapped on the tape pancake 23. That is, the hub 11 contacts that the tape pancake 23 after the point of tangency. This point of tangency is seen in more detail in FIG. 8. While the tape media 98 is shown in FIGS. 3 through 5, it is understood that it is in the same general configuration as that shown in FIG. 8 where it will be discussed in more detail. The tape media 98 forms the tape pancake 23 and the point of tangency is where the tape media 98 contacts the tape pancake 23. By contacting at or after the point of tangency, the pancake 23 has been wrapped before it is guided by the winding flange guide 10. FIG. 3a is a schematic representation of another embodiment of the present invention wherein the pack wheel 27 is spaced at an equal distance from the normal line 16 of the pancake 23. By being spaced at an equal distance ($D_1$ is equal to $D_2$), there would be uniform movement of the pack wheel 27 and guide 10 as the tape pancake 23 grows or decreases in size. The media 98 still contacts the tape pancake 23 before the guide 10.

A typical speed of a servo writer using a standard pack wheel is approximately 8 meters per second. The quality of the wind of a tape media may vary from 200 to 750 RA. The 200 RA would be a relatively good winding whereas 750 RA would represent a poor winding. By utilizing the guide 10 of the present invention, the wind quality will be in the range of 20 to 30 RA and would be able to do so with speeds up to 16 meters per second or even faster. The winding flange guide 10, with or without a pack wheel, improves the tape wind quality. The flanges 12, 13 constrain the floating wraps of a tape pancake 23 as it is being wound until the air between the wraps can either be forced out by a pack wheel or by the tension of the tape itself. The ability of the most recently wound wraps on a tape pancake 23 to move on entrapped layers of air results in an undesirable scatter winds and popped strands. By constraining these wraps until asperity to asperity contact between tape layers is achieved and the layers are locked into place, these problems can be avoided.

Figure 8:
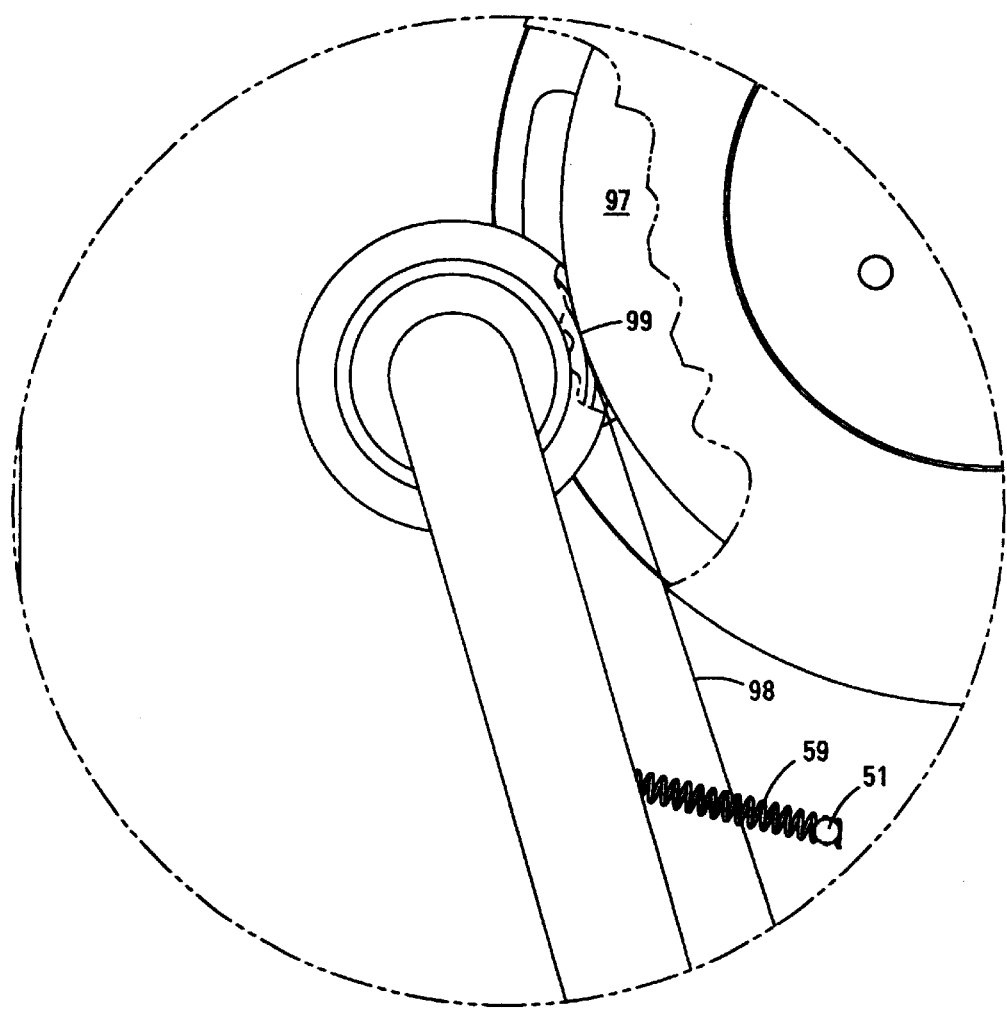
FIG. 8 is an enlarged portion of the cartridge shown in FIG. 7.
Figure 9:
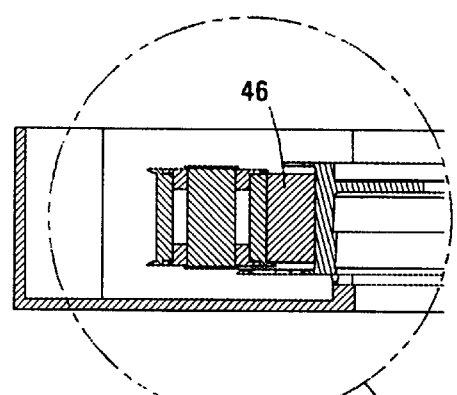
FIG. 9 is a cross-sectional view taken generally along the lines 9—9 in FIG. 7.
Figure 11:
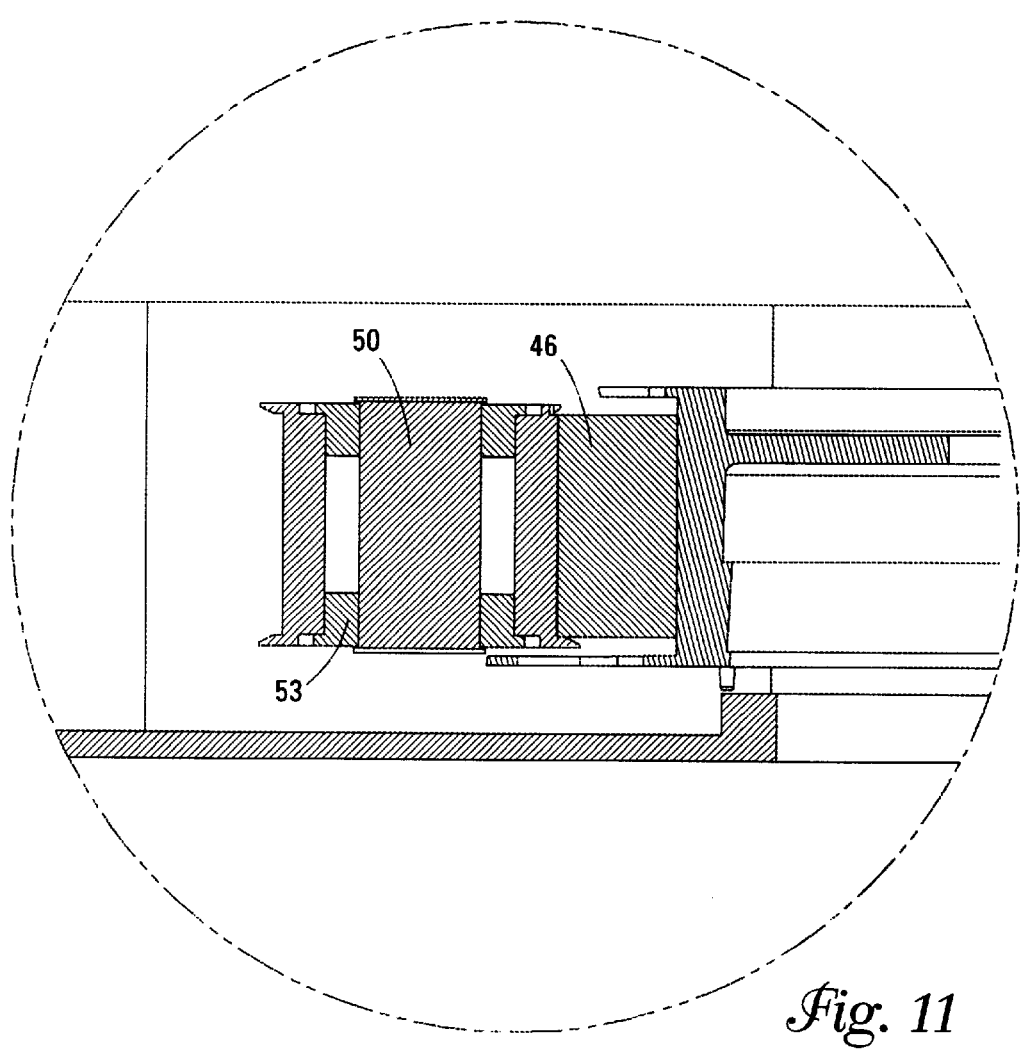
FIG. 11 is an enlarged view of a portion of the cartridge shown in FIG. 9.
Figure 10:
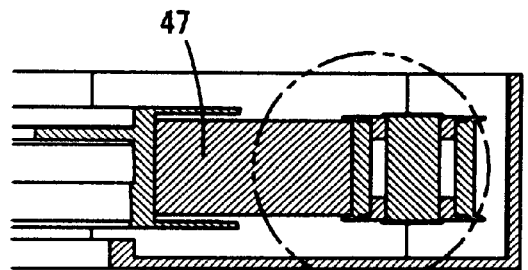
FIG. 10 is a cross-sectional view taken generally along the lines 10—10 shown in FIG. 7.
Figure 12:
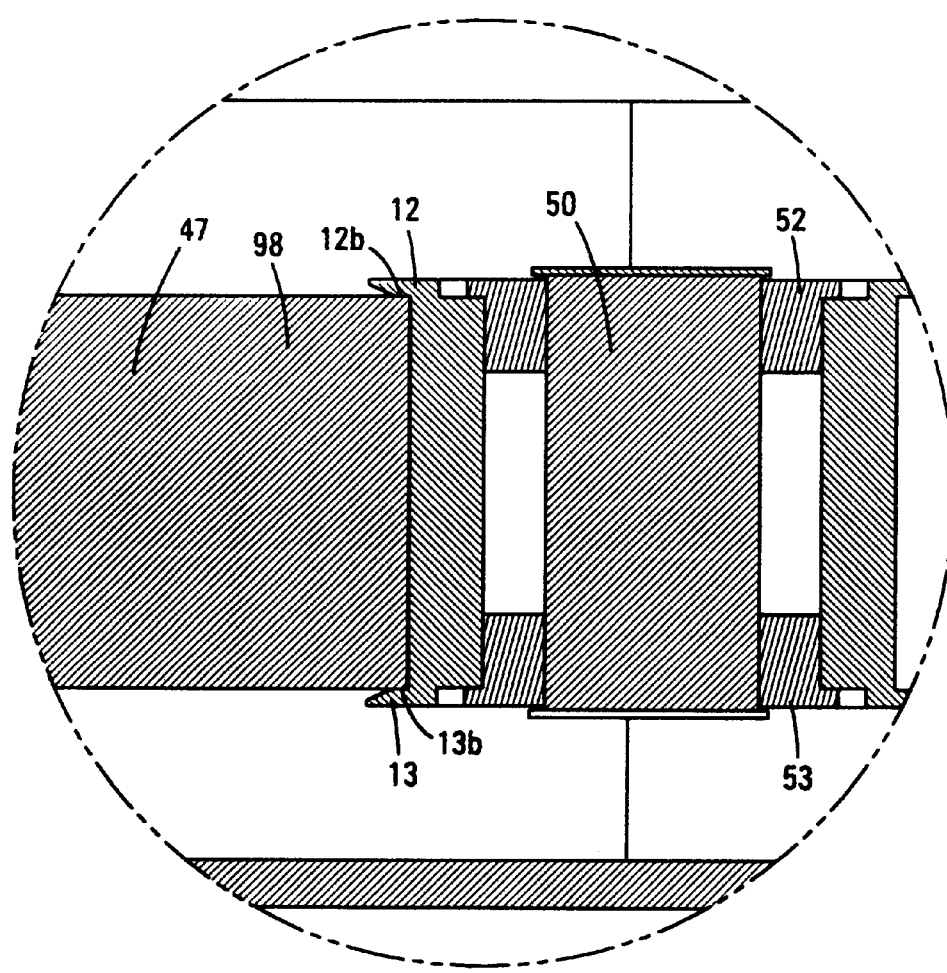
FIG. 12 is an enlarged view of a portion of the cartridge shown in FIG. 10.
Figure 13:
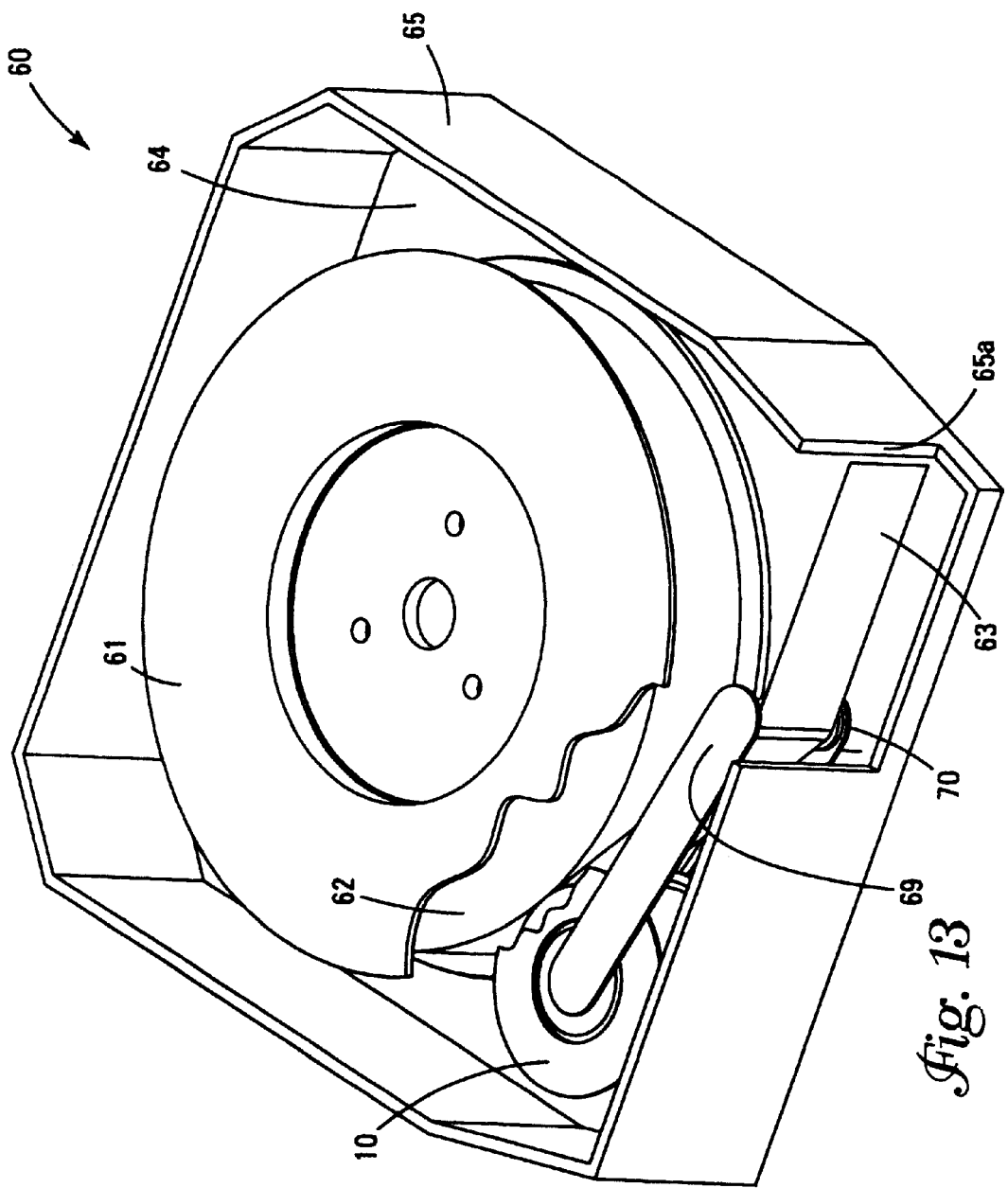
FIG. 13 is a perspective view of a single reel cartridge.
Figure 14:
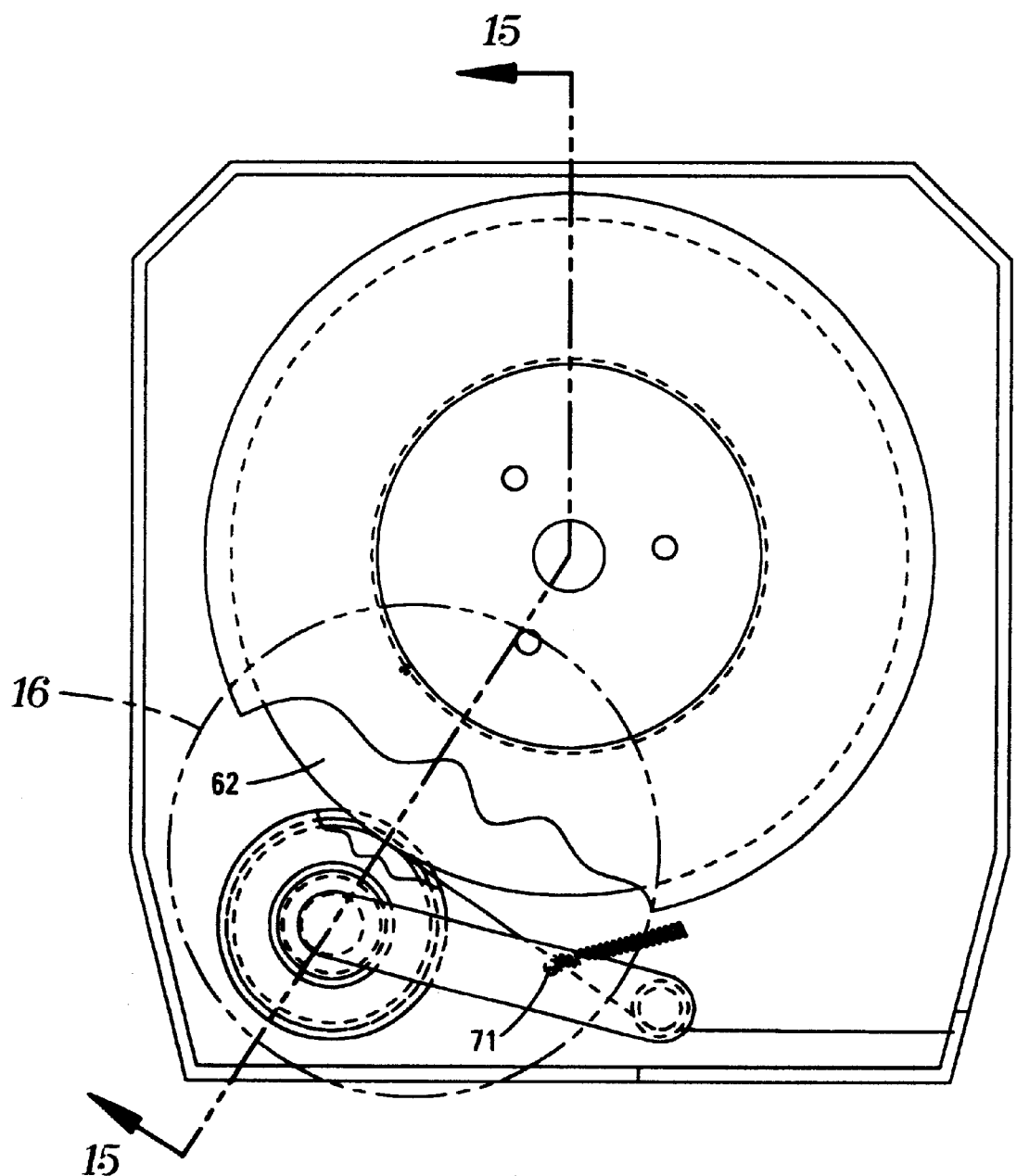
FIG. 14 is a top plan view of the cartridge shown in FIG. 13.

FIGS. 6–12 show the winding flange guide 10 of the present invention utilizing a tape cartridge, generally designated at 40. The tape cartridge 40 is shown with the cover removed. Further, the tape cartridge 40 illustrates the utilization of the winding flange guide 10 and is a representative tape cartridge, as the present invention may be utilized in any suitable cartridge. The tape cartridge 40 includes a first reel 41 and a second reel 42 both rotatably mounted on a base 43. Sidewalls 44 are operatively connected to the base 43 by means well known in the art and form a window 44a through which the tape media 98 may be accessed. The drive for the reels 41, 42 is not shown but may be any drive mechanism well known in the art. An idler guide 45 is positioned on each side of the window 44a to guide the tape media 98. The figures show a first tape pancake 46 which is smaller than the hub of the first reel 41 and a second tape pancake 47 which is larger than the hub of the second tape reel 42. In other embodiments, the hub can be larger for both reels. The size of the tape pancakes 46, 47 will increase or decrease depending upon the direction in which the reels 41, 42 are driven. An arm 48 has a first end pivotally mounted on a post 49 which is secured to the base 43. Another post 50 is operatively connected to the other end of the arm 48 and is positioned inside of the bore 11c of the hub section 11 of the winding flange guide 10. The arm 48 includes a top member 48a and a bottom member 48b, the post 50 being captured between the members 48a, 48b. A spring 59 has a first end secured to a post 51 which is secured to the base 43. A second end of the spring 59 is secured to the arm 48 thereby providing a biasing force to engage the guide 10 against the tape pancake 46. Another guide 10 is similarly mounted adjacent a second reel 42. FIGS. 9 and 11 illustrate the guide 10 engaging the tape pancake 46, as the tape pancake 46 is smaller than the size of the hub of the reel 41. FIGS. 10 and 12 show an enlarged view of the guide 10 engaging the second tape pancake 47 which is larger than the reel 42. In FIGS. 9 and 11, a portion of the top flange 12 and the hub of the reel 41 have been removed for clarity. It can be seen that the winding flange guide 10 will fit inside of the hub of the reel 41. In FIG. 12, especially, it can be seen how the outer wraps of the tape pancake 47 is between the lands 12b, 13b of the flanges 12, 13. Bearings 52, 53 are positioned around the post 50 and fit within the bore 11c of the hub section 11.

Referring to FIG. 8, it can be seen more clearly that the winding flange guide 10 contacts the pancake at or after the point of tangency 99 of the tape pancake 97. By having the winding flange guide 10 contact the tape pancake 97 after the point of tangency 99, the pancake 97 is wrapped before it is guided by the winding flange guide 10 and there is no wrapping that takes place at the winding flange guide 10.

Figure 17:
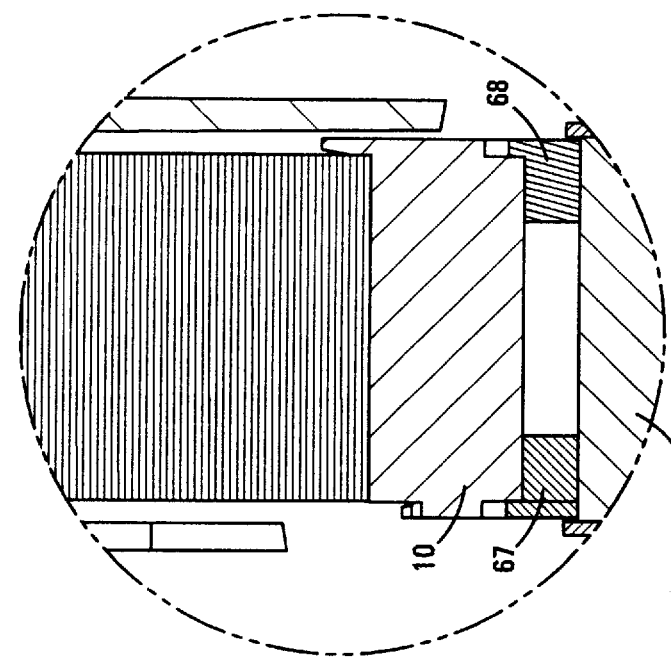
FIG. 17 is an enlarged portion of a portion of the cartridge shown in FIG. 15.
Figure 15:
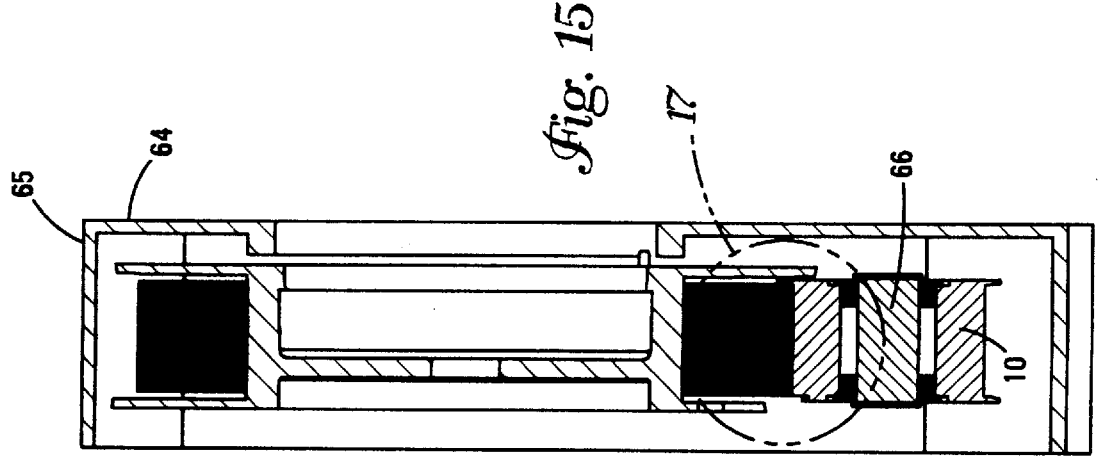
FIG. 15 is a cross-sectional view of the cartridge shown in FIG. 14, taken generally along the line 15—15.
Figure 16:
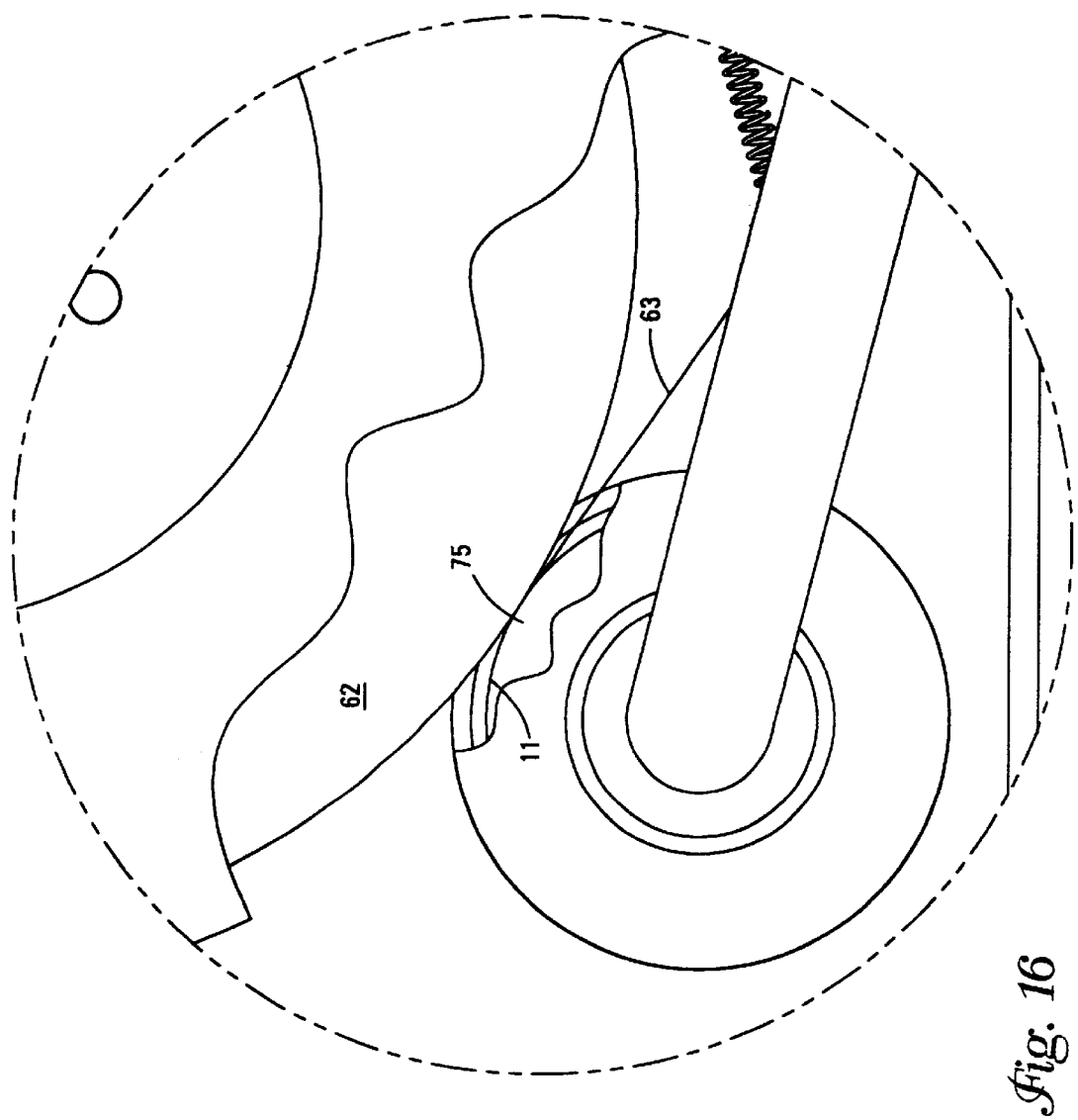
FIG. 16 is an enlarged view of a portion of the cartridge shown in FIG. 14.

FIGS. 13–17 show the winding flange guide 10 utilized in a single reel tape cartridge, generally designated at 60. The tape cartridge 60 includes a single reel 61 housing a tape pancake 62 formed by the tape media 63. Portions of the hub of the reel 61 and of the flange 12 have been removed. The tape cartridge 60 includes a base 64 and is suitably connected to side member 65. The side member 65 form a window 65a, as is well known in the art. The cover for the tape cartridge 60 is not shown. A tape leader is attached to the end of the media 63 and also is not shown, it being well known in the art. The winding flange guide 10 is pivotally mounted on a post 66. The post 66 is operatively connected to the base 64. Bearings 67, 68 are positioned around the post 66 which is mounted inside of the bore 11c of the hub section 11. The post 66 is captured between an upper arm 69 and a lower arm 70. Similar to the tape cartridge 40, a spring 71 provides a biasing force to bring the guide 10 in contact with the tape pancake 62. FIG. 16 shows an enlarged view of the contact of the guide 10 with the tape pancake 62. It can be seen that the media 63 is being wound to form the tape pancake 62. The hub section 11 contacts the tape pancake 62 past the point of tangency 75 that the tape media 63 forms with the tape pancake 62. Again, the wrapping of the tape pancake 62 takes place prior to the contact of the winding flange guide 10. FIG. 17 shows the plurality of wraps of the media 63 on the tape pancake being constrained between the lands of the tape guide, it being known that the top land has been broken away.

Figure 18:
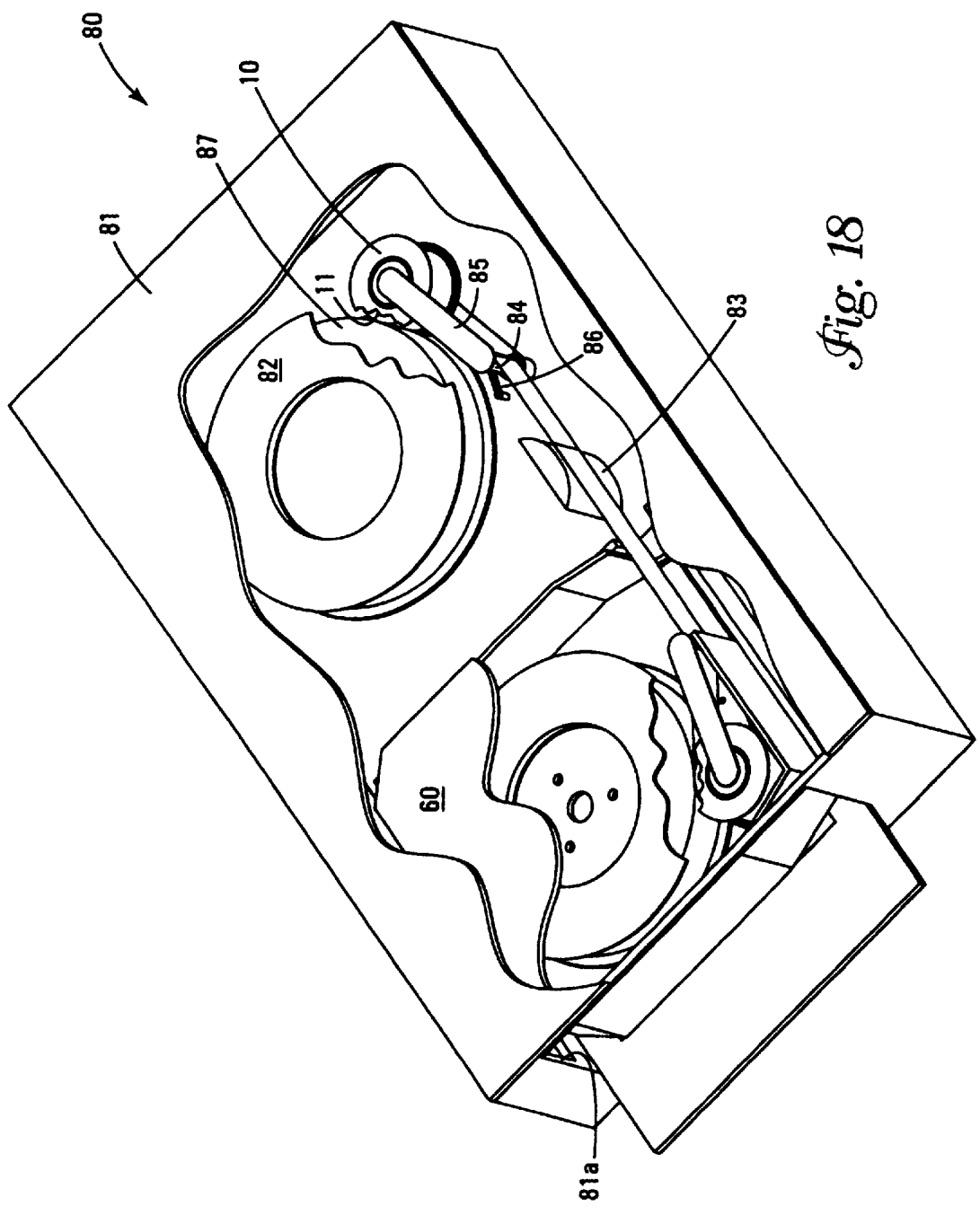
FIG. 18 is a perspective view of a drive incorporating the winding flange guide shown in FIG. 1.

FIGS. 18 and 19 show the winding flange guide 10 in use with a tape drive, generally designated at 80. The tape drill 80 is shown in use with a single tape cartridge 60, it being understood that a tape drive may also be utilized with a dual tape cartridge, such as tape cartridge 40. The tape drive 80 has a housing 81, having an opening 81a through which the tape cartridge 60 is inserted. The tape drive wheel 82 is driven from below by means well known in the art (not shown). Similarly, the cartridge 60 will typically have sprockets (not shown) well known in the art for driving the cartridge 60. A read/write head 83 is shown positioned inside of the tape drive 80, the construction of which is well known in the art. The tape drive 80, described thus far, is well known in the art and may be any typical tape drive. The use of the winding flange guide 10 in the tape drive 80 is new, in comparison to the prior art, and only this feature will be described in more detail. A post 84 is mounted in the housing 81 and pivotally mounts an arm 85 having a top member 85a and a bottom member 85b. The winding flange guide 10 is operatively mounted on a post the same as previously described in prior embodiments of the present invention and is not described in more detail, The spring 86 provides a biasing force to hold the hub 11 against the tape pancake 87. Again, the hub 11 contacts the tape pancake 87 past the point of tangency. The tape leader (not shown) is secured in the reel 82 by means well known in the art. Similarly, the leader attachment arm is standard and is not shown.

It can be seen that for a cartridge, the source of the magnetic tape for the take-up reel is that portion of the magnetic tape not in the tape pancake. For the drive, the source would be the cartridge. The source for the servo writer would be the supply of tape from another section (not shown) of the servo writer.

We claim:

1. A take-up reel assembly for receiving a magnetic tape having a thickness and a width, from a tape source comprising:
 a) a mounting member;
 b) a rotatable take-up reel, the magnetic tape having a first end operatively connected to the take-up reel, the take-up reel operatively connected to the mounting member;
 c) a rotatable idler guide positioned between the take-up reel and tape source, the idler operatively connected to the mounting member;
 d) the magnetic tape forming a tape pancake as the magnetic tape is wound around the take-up reel, and creating a tangent point where the magnetic tape contacts the tape pancake;
 e) a winding flange guide operatively connected to the mounting member, the guide comprising:
  i) a hub having a first end and a second end;
  ii) a first flange operatively connected to the first end of the hub, the first flange having a first guiding surface; and
  iii) a second flange operatively connected to the second end of the hub, the second flange having a second guiding surface;
 f) the winding flange guide positioned to contact the tape pancake at or after the point of tangency, wherein the tape pancake is guided between the first and second guiding surfaces;
 g) the first flange and the second flange having a land section having a length that is less than 100 times the thickness of the magnetic tape;
 h) the length of the land sections are greater than 10 times the thickness of the tape media;
 i) the first and second guiding surfaces are spaced at a distance, the distance is from 0.0002 inches to 0.0012 inches greater than the width of the magnetic tape and the guiding surfaces having a finish of at least 8Ra microinches; and
 j) a pack wheel, the winding flange guide positioned between the pack wheel and the idler guide.

2. The tape-up reel assembly of claim 1, further comprising the winding flange guide being mounted with a bias to contact the tape pancake and move as the tape pancake changes in size.

3. A take-up reel assembly for receiving a magnetic tape having a thickness and a width, from a tape source, comprising:
 a) a rotatable take-up reel, the magnetic tape having a first end operatively connected to the take-up reel;
 b) a rotatable idler guide positioned between the take-up reel and tape source;
 c) the magnetic tape forming a tape pancake as the magnetic tape is wound around the take-up reel, and creating a tangent point where the magnetic tape contacts the tape pancake;
 d) a winding flange guide, the guide comprising:
  i) a hub having a first end and a second end;
  ii) a first flange operatively connected to the first end of the hub, the first flange having a first guiding surface; and iii) a second flange operatively connected to the second end of the hub, the second flange having a second guiding surface;

e) the winding flange guide positioned to contact the tape pancake at or after the point of tangency, wherein the tape pancake is guided between the first and second guiding surfaces; and f) a pack wheel, the winding flange guide positioned between the pack wheel and the idler guide.

4. The take-up reel of claim 3, further comprising the first flange and the second flange having a land section with a length that is less than 100 times the thickness of the magnetic tape.

5. The take-up reel of claim 4, wherein the land length of the first and second flanges is less than 60 times the thickness of the magnetic tape.

6. The take-up reel of claim 4, wherein the length of the land section is greater than 10 times the thickness of the magnetic tape.

7. The take-up reel of claim 3, further comprising the first and second guiding surfaces are spaced at a distance, the distance is from 0.0002 inches to 0.0012 inches greater than the width of the magnetic tape and the guiding surfaces having a finish of at least 8Ra microinches.

8. The take-up reel of claim 7, wherein the distance is from 0.0002 inches to 0.0007 inches greater than the width of the magnetic tape.

9. A servo writer comprising:

a) a mounting member;

b) a rewind assembly plate slidably mounted to the mounting member;

c) a take-up reel rotatably mounted to the mounting member;

d) a rotatable idler guide operatively connected to the mounting member;

e) a magnetic tape forming a tape pancake as the magnetic tape is wound around the take-up reel, and creating a tangent point where the magnetic tape contacts the tape pancake;

f) a winding flange guide operatively connected to the rewind assembly plate, the guide comprising:

i) a hub having a first end and a second end;

ii) a first flange operatively connected to the first end of the hub, the first flange having a first guiding surface; and iii) a second flange operatively connected to the second end of the hub, the second flange having a second guiding surface;

g) the winding flange guide positioned to contact the tape pancake at or after the point of tangency, wherein the tape pancake is guided between the first and second guiding surfaces; and h) a pack wheel operatively connected to the rewind plate assembly, the winding flange guide positioned between the pack wheel and the idler guide.

10. The servo writer of claim 9, further comprising the first flange and the second flange having a land section having a length that is less than 100 times the thickness of the magnetic tape.

11. The servo writer of claim 10, wherein the length of the land section is greater than 10 times the thickness of the tape media.

12. The servo writer of claim 11, further comprising the first and second guiding surfaces are spaced at a distance, the distance is from 0.0002 inches to 0.0012 inches greater than the width of the magnetic tape and the guiding surfaces having a finish of at least 8Ra microinches.

* * * * *